United States Patent [19]
Katayama

[11] 3,773,087
[45] Nov. 20, 1973

[54] FLEXIBLE EXTENSIBLE AND CONTRACTABLE TUBE

[76] Inventor: Hiroshi Katayama, No. 41-10 Sanno 3-chome, Ohta-ku, Tokyo, Japan

[22] Filed: Sept. 8, 1970

[21] Appl. No.: 70,287

[52] U.S. Cl.................. 138/120, 138/121, 285/236
[51] Int. Cl............................................. F16l 11/00
[58] Field of Search ..................................
138/111–136; 285/149, 236

[56] References Cited
UNITED STATES PATENTS

| | | | |
|---|---|---|---|
| 2,836,200 | 5/1958 | Webbe................................ | 138/121 |
| 3,060,069 | 10/1962 | Sindars................................ | 138/120 |
| 3,266,059 | 8/1966 | Steule.................................. | 138/120 |

FOREIGN PATENTS OR APPLICATIONS

| | | | |
|---|---|---|---|
| 874,022 | 8/1961 | Great Britain...................... | 138/121 |

Primary Examiner—Houston S. Bell, Jr.
Attorney—Clario Ceccon

[57] ABSTRACT

A flexible extensible and contractible tube is provided which comprises a main body of straight tube joined at its opposite ends with a pair of bellows tubes, the outer surface of the straight and bellows tubes being encased by a network formed of braided wire or strip material, the network being clamped at its ends to extensions of the bellows tubes with clamping members. The present invention is simple to form, exhibits reduced resistance to fluid flow through its interior, permits ready extension and contraction of the network, and maintains well stabilized shape.

1 Claim, 5 Drawing Figures

3,773,087

FLEXIBLE EXTENSIBLE AND CONTRACTABLE TUBE

INTRODUCTION

The invention relates to a flexible extensible and contractible tube and, in particular, to such tube of the type including bellows tubes encased in a braided network.

THE PRIOR ART

Known tubes of the type described involve many drawbacks. One is the failure to provide sufficient extensibility when subjected to a dip in the ground or other external forces after their installation, because of their structural defects which cause the self-deformation of the tube, principally at its central portion. In addition, the wave shaped bellows tube requires complex molding operations and is liable to yield and cause a bend at the center when it is supported at its opposite ends. Such self-deformation at the center of the tube significantly impedes its action to assist in the extension and contraction of the network, thereby rendering it difficult to maintain its form.

BRIEF SUMMARY OF THE INVENTION

It is an object of the invention to provide an extensible flexible and contractible tube which overcomes the disadvantages of the prior art tube of the kind described, by simplifying the required forming operation.

It is another object of the invention to provide a flexible extensible and contractible tube which exhibits a reduced amount of self-deformation and an improved adaptability to a dip of the ground or any other external force.

It is a further object of the invention to provide a flexible extensible and contractible tube which exhibits a reduced resistance to fluid flow through the interior of the main body.

It is still another object of the invention to provide a flexible extensible and contractible tube which upon flexible extension and contraction, assists in the extension and contraction of the network portion which encases the outer periphery of the flexible extensible and contractible tube.

THE DRAWINGS

Further details of the invention will become apparent as the description proceeds with reference to the drawings, in which.

DETAILED DESCRIPTION OF THE INVENTION

Figure 1:
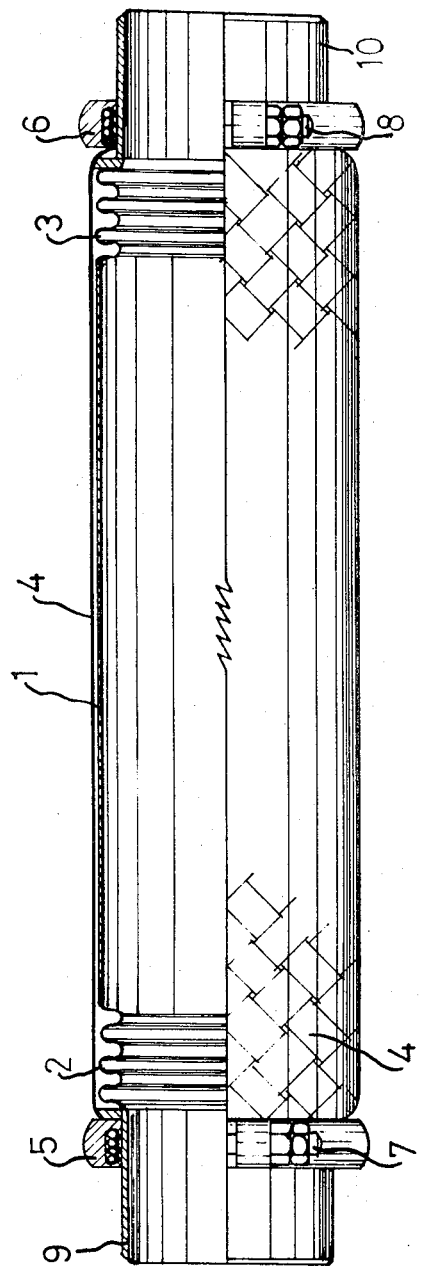
FIG. 1 is a longitudinal half section view of the flexible extensible and contractible tube according to the invention.
Figure 2:
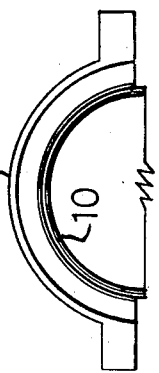
FIG. 2 is a partial end elevation of the tube shown in FIG. 1.

Referring to FIGS. 1 and 2, which show a first embodiment of the tube of the invention, numeral 1 denotes a main body of a straight, substantially nonelastic tube, which is connected at its opposite ends with bellows tubes 2 and 3. The outer periphery of the main body 1 and the tubes 2 and 3 are encased with a mesh type network 4 comprising principally braided, strip or wire material. The two ends of the network 4 are clamped by means of split clamping rings 5 and 6.

Figure 5:
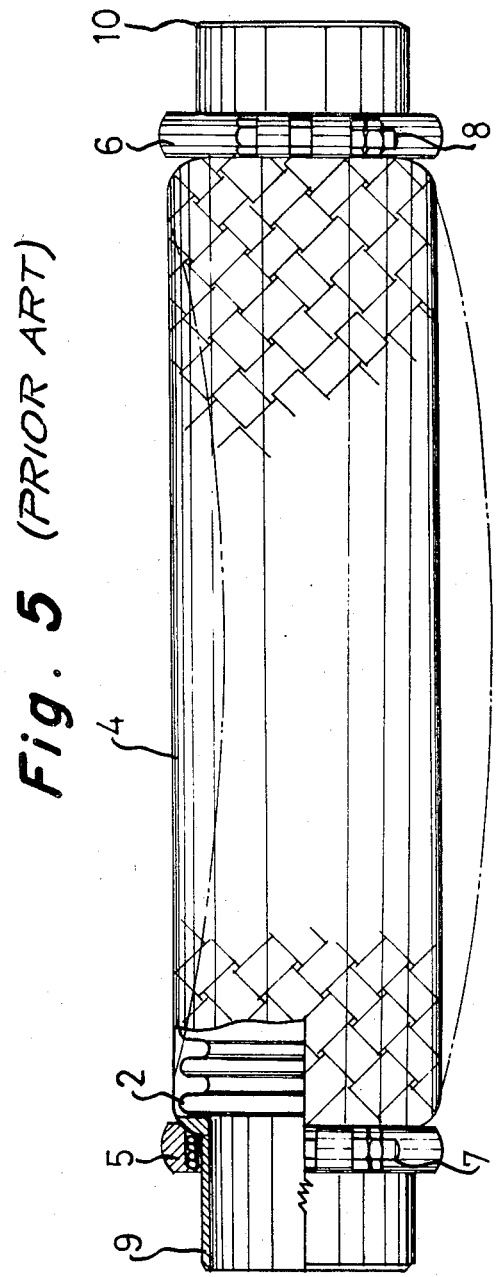
FIG. 5 is a longitudinal view, partially in section, of a typical flexible extensible and contractible tube of the prior art.

Because this embodiment comprises a straight tube in its main body portion, the forming operation is greatly simplified, and the flexible extensible and contractible tube is free from the disadvantageous self-deformation, as is found in the prior art tube shown by dot and dash outline in FIG. 5. Thus, with the flexible extensible and contractible tube of the invention, the bellows tubes 2 and 3, connected to the opposite ends of the main body 1, demonstrate their resistance to a dip of the ground or any other external force. In addition, the straight tube in the central main body 1 achieves a reduced resistance to fluid flow. The general arrangement that the central portion is formed by a straight tube which is joined at its opposite ends with bellows tubes and encased with a network permits deformation of the both bellows tubes alone, upon flexible extension and contraction. Consequent extension and contraction of the network on the outer periphery of the bellows tubes, while the straight tube in the central portion remains without deformation, provides that part of the network which covers such straight tube portion assist in the extension and contraction of the other network portions during deformation of the bellows tubes located at both ends, thereby effectively stabilizing and maintaining its shape.

Figure 3:
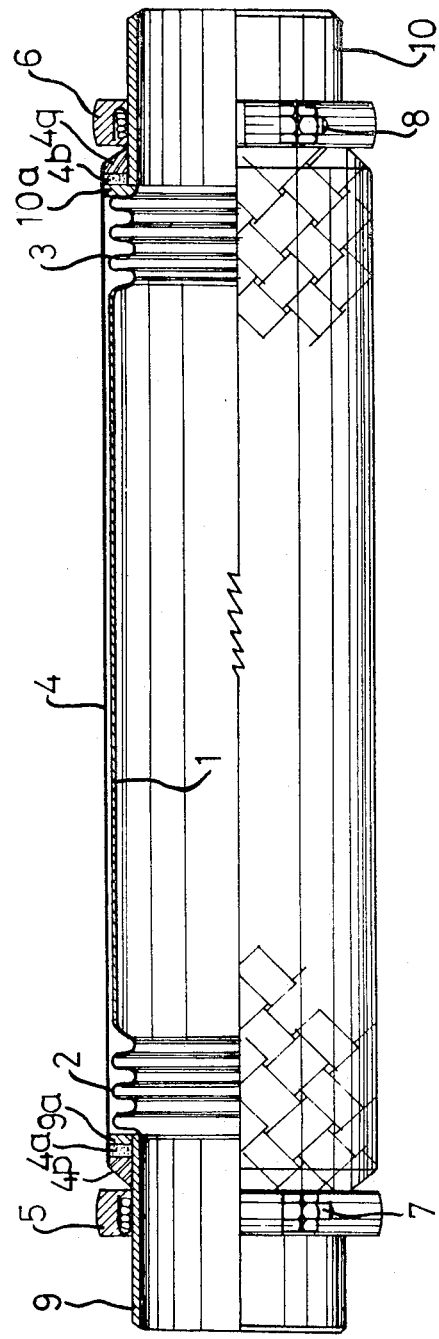
FIG. 3 is a longitudinal, half section view of the flexible extensible and contractible tube according to another embodiment of the invention.
Figure 4:
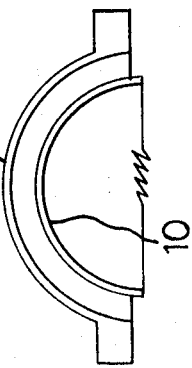
FIG. 4 is a partial end elevation of the tube shown in FIG. 3.

Referring now to FIGS. 3 and 4, which show a second embodiment of the flexible extensible and contractible tube according to the invention, numeral 1 denotes a substantially nonelastic straight tube used in the present extensible flexible and contractible tube. The straight tube 1 is connected at its opposite ends with bellows tubes 2 and 3 of reduced length, the outer periphery of which is encased by a mesh type network 4 formed of braided strip or wire material. Mounted within the inner wall of the right and left hand ends of the network 4 are flanges 9a, 10b of short tubes 9 and 10, rings of resilient material 4a, 4b and straps 4p and 4q. In the drawings, numerals 5 and 6 denotes split clamping rings which surround and secure both ends of the network 4 in a suitable manner, and 7 and 8 denote locking members.

In the flexible tube of the second embodiment, the forming operation is facilitated and the resistance to fluid flow is substantially reduced because both bellows tubes 2 and 3 are of short length and the main body comprises the cylindrical straight tube 1. The central portion comprising the straight tube prevents the self-deformation which results from a bending of the central portion in the prior art tube. The general arrangement that the tube of the invention has its central portion formed by a straight tube, which is joined at its opposite ends with bellows tubes of reduced length and having their outer periphery encased with a network, permits the deformation of only the bellows tubes located at opposite ends, upon flexible extension and contraction. Though this accompanies the extension and contraction of the network on the outer periphery of the bellows tubes, the straight tube in the central portion remains free from deformation, so that that part of the network which covers said central portion assists in the extension and contraction of other network portions during the deformation of the end bellows tubes, thereby effectively stabilizing and maintaining the tube shape. The flexibility is further increased by the provision of resilient rings 4a and 4b in the spaces between the flanges 9a, 10a of short tubes 9, 10 joined with the bellows tubes inside the network and the straps 4p and 4q.

As a result of such construction, the tube exhibits an excellent adaptability to a dip of the ground or any other external vibrations and shocks, when attached to a tank (not shown) for example, by responding to such load with a desired extensibility or contractibility afforded by an integral structure comprising the straight tube 1 as the main body, the left and right hand bellows tubes 2 and 3 and the network 4, which is mounted through the resilient materials 4a, 4b and the straps 4p, 4q.

As will be noted from the foregoing, the flexible tube of the invention demonstrates several useful and effective features as compared with prior art, and is adapted for mass production, so that it may be made available on the market at low prices.

What is claimed is:

1. A flexible, extensible and contractible tube comprising an elongated, rigid, tubular main body that is straight throughout the length thereof, a tubular, flexible bellows coaxially and contiguously secured to each end of said main body, the combination of said main body and said bellows defining a tubular member having a rigid, central section and flexible sections at each end thereof, an elongated, tubular, mesh-type network coaxially encasing the entire length of said main body and said bellows, said network being both extensible and contractible, means for clamping siad network relative to said bellows, a rigid, tubular extension having a transverse flange coaxially secured to each said bellows, said network being additionally secured to said extension by said clamping means, and a resilient ring intermediate each said flange and each said clamping means.

* * * * *